(12) United States Patent
Meyers et al.

(10) Patent No.: US 6,356,188 B1
(45) Date of Patent: Mar. 12, 2002

(54) WHEEL LIFT IDENTIFICATION FOR AN AUTOMOTIVE VEHICLE

(75) Inventors: Joseph Carr Meyers, Farmington Hills; Todd Allen Brown, Dearborn, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/669,513

(22) Filed: Sep. 25, 2000

(51) Int. Cl.⁷ ................................................. B60Q 1/00
(52) U.S. Cl. ........................ 340/440; 340/438; 340/441; 340/465; 180/172; 180/197; 701/36; 701/41; 701/42; 701/45; 701/46; 701/70; 701/71
(58) Field of Search ................................ 340/440, 438, 340/441, 465; 180/172, 197; 701/36, 1, 41, 42, 45, 46, 69, 70, 71, 91

(56) References Cited

U.S. PATENT DOCUMENTS

| | | | | |
|---|---|---|---|---|
| 4,650,212 A | * | 3/1987 | Yoshimura | 280/707 |
| 4,761,022 A | * | 8/1988 | Ohashi et al. | 280/772 |
| 4,976,330 A | * | 12/1990 | Matsumoto | 180/197 |
| 5,265,020 A | * | 11/1993 | Nakayama | 364/424.05 |
| 5,370,199 A | * | 12/1994 | Akuta et al. | 180/197 |
| 6,002,974 A | * | 12/1999 | Schiffmann | 701/36 |

* cited by examiner

Primary Examiner—Daniel J. Wu
Assistant Examiner—Tai T. Nguyen
(74) Attorney, Agent, or Firm—Gregory P. Brown

(57) ABSTRACT

A system for detecting wheel lift of an automotive vehicle has a speed sensor (22) coupled to a wheel (12) of automotive vehicle (10). A torque control system (20) is coupled to wheel (12) to change the torque at the wheel. A controller (18) is coupled to the torque control system and a speed sensor. The controller (18) determines lift by changing the torque of the wheel, measuring the change in torque and indicating lift in response to the change in torque which may be indicated by wheel speed.

21 Claims, 2 Drawing Sheets

WHEEL LIFT IDENTIFICATION FOR AN AUTOMOTIVE VEHICLE

TECHNICAL FIELD

The present invention relates generally to a dynamic behavior control apparatus for an automotive vehicle, and more specifically, to a method and apparatus for determining whether a wheel of an automotive vehicle has lifted from the pavement.

BACKGROUND

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Typically, the dynamic control systems do not address roll of the vehicle. For high profile vehicles in particular, it would be desirable to control the rollover characteristics of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the body on a plane or nearly on a plane parallel to the road surface. Rollover control is used to maintain the vehicle wheels on the road surface.

Such systems typically use position sensors to measure the relative distance between the vehicle body and the vehicle suspension. One drawback to such systems is that the distance from the body to the road must be inferred.

It would therefore be desirable to provide a rollover detection system having reduced costs and increased reliability in predicting the occurrence of a rollover.

SUMMARY OF THE INVENTION

It is therefore one object of the invention to provide a rollover detection system that may be used in conjunction with the dynamic stability control system of the vehicle to determine rollover.

In one aspect of the invention, a wheel lift identification system for an automotive vehicle includes a speed sensor coupled to the vehicle producing a wheel speed signal. A torque control system is coupled to the wheel for changing the torque at the wheel. A controller is coupled to the torque control system and the speed sensor. The controller determines lift by changing the torque of the wheel, measuring the change in wheel speed since the torque was changed, and indicating a wheel lift if the change in the wheel speed is greater than a predetermined value.

In a further aspect of the invention, a method for determining wheel lift of a vehicle comprises the steps of:
  changing the torque of a wheel;
  measuring the change in wheel speed since the step of changing torque; and,
  indicating wheel lift if the change in wheel speed is greater than a predetermined value.

In a further aspect of the invention, the changing of the torque of the wheel may be performed by increasing the brake pressure for that wheel. When the wheel speed has significant deceleration, a wheel flag is set. When the brake pressure is released and the wheel speed changes greater than a reacceleration threshold, then wheel contact is assumed. If the wheel speed does not increase over the reacceleration threshold within a predetermined time, then wheel lift status is confirmed. As an alternative, driveline torque may be used.

One advantage of the invention is that in vehicles employing a dynamic stability control system, additional sensors may not be required.

Other objects and features of the present invention will become apparent when viewed in light of the detailed description of the preferred embodiment when taken in conjunction with the attached drawings and appended claims.

DESCRIPTION OF THE PREFERRED EMBODIMENT

The present invention is described with respect to a wheel lift identification system for an automotive vehicle. Those skilled in the art will recognize that the present invention may be incorporated into a rollover prevention system for an automotive vehicle.

Figure 1:
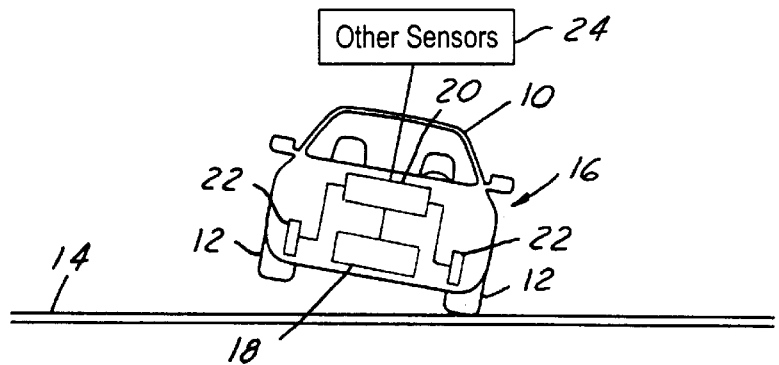
FIG. 1 is a partial cutaway view of an automotive vehicle having a wheel lift identification system according to the present invention.

Referring now to FIG. 1, an automotive vehicle 10 has a plurality of wheels 12, two of which are shown as elevated above a road plane 14. A roll control system 16 is included within vehicle 10. The roll control system 16 is used to counteract the lifting of wheels 12 from road plane 14 as will be further described below. Roll control system 16 includes a roll controller 18 that is preferably microprocessor based. Roll controller 18 may be part of a dynamic stability control system of the automotive vehicle 10. Roll controller 18 is coupled to a torque control system 20 that is used to control the torque of the wheels 12. Although torque control system 20 is illustrated as a separate item, torque control system 20 may be included in roll controller 18 which may in turn be included within a dynamic stability control system. Torque control system 20 may act in conjunction with the electronic engine controller, a driveline engagement mechanism or braking system, or a combination of these to control the torque at one or all of the wheels 12. Torque controller 20 and roll controller 18 may be coupled to wheel speed sensors 22 located at each of the wheels 12. Wheel speed sensors 22 provide roll controller 18 with a signal indicative of the speed of the individual wheel to which it is attached. Various types of wheel speed sensors including toothed-wheel type systems would be evident to those skilled in the art.

Other sensors 24 may be coupled to roll control system 16. For example, roll angle sensors, steering wheel angle sensors, yaw rate sensors, and other sensors may be incorporated therein. Other sensors 24, as will be further described below, may be used to identify a condition suitable for the potential of wheel lift. Such a condition may initiate further action by roll control system 16 to verify wheel lift.

In the following example, the application of brake pressure is used to provide the change in torque. However, other methods such as applying engine torque may also be used to change the amount of torque at a wheel. Further references to the application of torque to a wheel may include hydraulic or electric brake torque, changes in engine torque or engagement of driveline torque through the use of an electronically controlled transfer case, differential, transmission or clutch. The present invention may also be used to determine if a sensor has failed in the roll control system 16. That is, if roll is suspected by a particular sensor but all other conditions or sensors indicate otherwise, the sensor may be operating improperly. Also, although speed is used, wheel acceleration may also be used in place of speed as would be evident to those skilled in the art.

Figure 2:
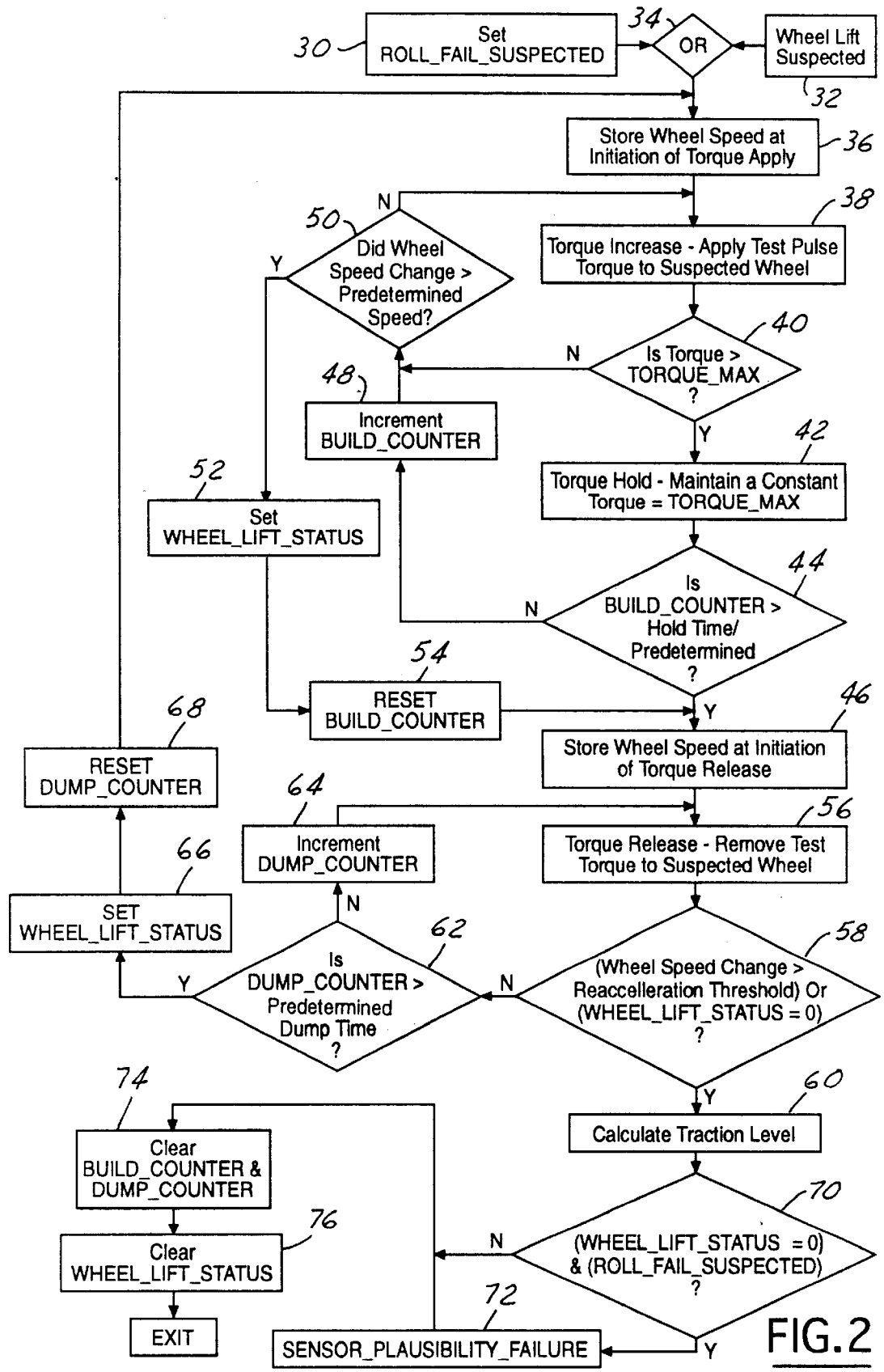
FIG. 2 is a flow chart of a wheel lift identification system according to the present invention.

Referring now to FIG. 2, in step 30, if a roll sensor failure is suspected or in step 32 if wheel lift is suspected by the roll control system 16, block 34 initiates the wheel lift determination process. In step 36, torque is applied to the wheel suspected of lifting and the wheel speed at the suspected wheel is stored. In step 38, the torque is increased by applying a test pulse of torque to the suspected wheel. Torque is applied until a torque threshold (Torque__Max) is achieved. In step 40, if the torque is greater than the Torque__Max, the torque is held constant in step 42. In step 44, if the time as counted by the Build__Counter is greater than a predetermined time, step 46 is executed in which the torque is released and the wheel speed at the initiation of the release of torque is stored. In step 44, if the counter is not greater than the predetermined hold time, the counter is incremented in step 48. After step 48 the change in wheel speed is compared to a predetermined change in wheel speed. If the wheel speed change is not greater than a predetermined speed in step 50, steps 38–44 are again executed. If the wheel speed change is greater than a predetermined speed, this indicates a lifted wheel. In this case, step 52 is executed in which a wheel lift status flag is set. After step 52, step 54 is executed in which the build counter is reset.

Referring back to step 40, if the torque is not greater than the torque threshold then step 50 is executed.

Referring back to step 46, after the wheel speed is recorded after the torque release, step 56 is executed. In step 56 torque is released. After step 56, step 58 is implemented in which the wheel speed change is compared to a reacceleration threshold. The reacceleration threshold is a predetermined value that corresponds to a wheel speed change that should be achieved should wheel contact be reestablished. The wheel speed change is determined from the time that the torque was released. If the wheel speed change is greater than a reacceleration threshold or if the wheel lift status from steo 52 is zero, wheel contact is assumed. In such a case the traction level may be calculated in step 60. If the wheel speed does not increase over the reacceleration threshold, then the wheel lift status is confirmed beginning with step 70.

Referring back to step 58, if the wheel speed is less than the reacceleration threshold, step 62 compares the Dump__Counter to a predetermined dump time. If the predetermined dump time is greater than the Dump__Counter, then the Dump__Counter is incremented in step 64 and steps 56 and 58 are again executed. If the Dump__Counter is greater than the predetermined dump time, then the wheel lift status flag is set in step 66 and the Dump__Counter is reset in step 68. After step 68, the process is reinitiated and returns to step 36.

Returning back to step 60, the traction level is calculated in step 60. After step 60, the plausibility of a sensor failure is determined. If, for example, the process was initiated based on the suspicion of a sensor failure from block 30 above and no wheel lift was detected, a sensor failure is indicated in step 72. For either result, if a sensor failure is indicated by block 70 or not, the build counter and Dump__Counter are cleared in block 74 and the wheel lift status is cleared in block 76. The end of the routine occurs in block 78.

Thus, as can be seen, the application of torque can be used to first determine whether a suspected wheel has lifted from the pavement. For confirmation, the removal of the torque and the resulting wheel speed change may be used to confirm the initial finding. Advantageously, the system may be implemented in a dynamic stability system of an automotive vehicle without adding further sensors. If rollover is detected, then the rollover can be corrected by applying the brakes or generating a steering correction.

Figure 3A:
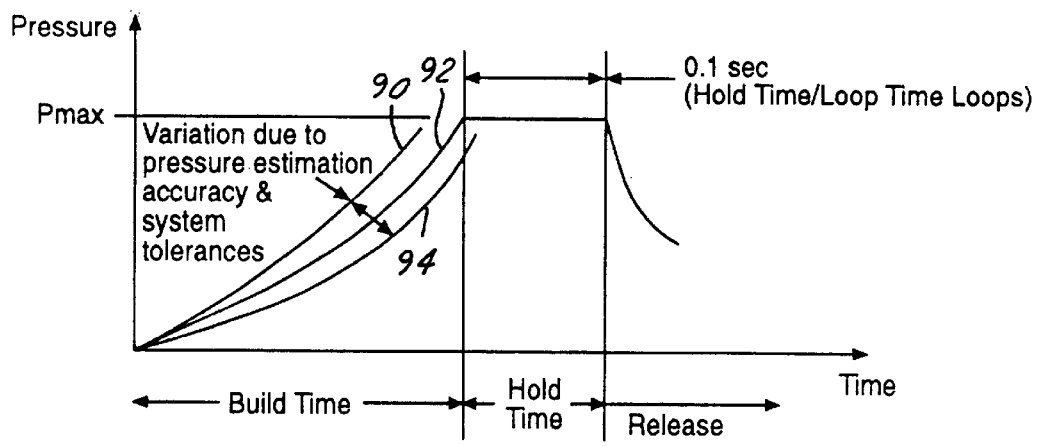
FIG. 3A is a plot of pressure versus time for a wheel lift identification system according to one embodiment of the present invention.

Referring now to FIG. 3A, various lines 90, 92, 94 are illustrated during the build time to illustrate the variation in pressure of the braking system due to wear and other effects of the brakes. Lines 90, 92 94 have little effect on the overall operation of the system. Thus, the thresholds and parameters are selected so that the system is robust to wear and system variation. The maximum pressure $P_{max}$ is reached and maintained for a hold time (such as set forth in step 42 above) until it is released.

Figure 3B:
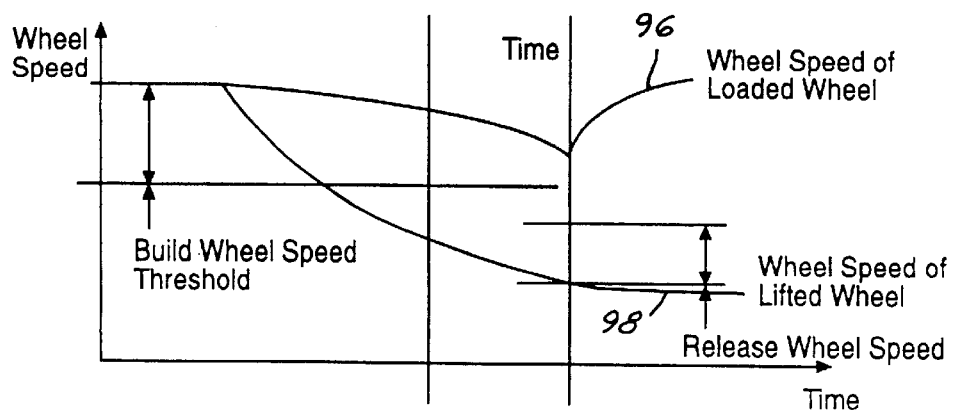
FIG. 3B is a plot of wheel speed versus time for a wheel lift identification system according to one embodiment of the present invention.

Referring now to FIG. 3B, a plot of wheel speed corresponding to the various times is illustrated. As shown, the wheel speed of a loaded wheel is illustrated by line 96 which is higher than the wheel speed of a lifted wheel illustrated by line 98.

While particular embodiments of the invention have been shown and described, numerous variations alternate embodiments will occur to those skilled in the art. Accordingly, it is intended that the invention be limited only in terms of the appended claims.

What is claimed is:

1. A method for determining wheel lift of a wheel of an automotive vehicle comprising the steps of:

applying a change of torque to the wheel;

measuring a change in a wheel condition since initiating the step of applying a change of torque;

indicating wheel lift if the change in the wheel condition is greater than a predetermined value.

2. A method as recited in claim 1 wherein the condition is one selected from the group of acceleration and speed.

3. A method as recited in claim 1 further comprising the step of removing the change of torque;

measuring a wheel condition after the step of removing the change of torque.

4. A method as recited in claim 3 further comprising the step of determining whether the second wheel condition is above a threshold.

5. A method as recited in claim 1 wherein the step of applying a change of torque comprises applying a brake to the wheel.

6. A method as recited in claim 5 further comprising the step of releasing the brake;

determining a wheel condition after the step of releasing the brake;

when the wheel condition does not increase over a reacceleration threshold, confirming wheel lift;

when wheel speed condition increases over a reacceleration threshold, indicating wheel contact.

7. A method as recited in claim 1 wherein the step of applying a change of torque comprises applying engine torque.

8. A method for monitoring a predetermined condition of an automotive vehicle having a plurality of wheels comprising the steps of:

determining a potential for the predetermined condition of the wheel;

measuring a first wheel speed;

thereafter, changing the torque of a suspected lifting wheel from a first torque to a second torque;

changing the torque from the vehicle from the second torque to the first torque;

measuring a second wheel speed;

determining a wheel speed change as a function of the first wheel speed and the second wheel speed;

when the change in wheel speed is greater than a reacceleration threshold, confirming the predetermined condition.

9. A method as recited in claim 8 wherein the predetermined condition is a function of roll angle, steering wheel angle, and road bank angle.

10. A method as recited in claim 8 wherein the step of changing the torque comprises the step of applying the brake.

11. A method as recited in claim 8 wherein the step of changing the torque comprises the step of applying engine torque.

12. A method as recited in claim 8 wherein a predetermined condition comprises a sensor failure.

13. A method as recited in claim 8 wherein the predetermined condition comprises wheel lift.

14. A method as recited in claim 8 further comprising the step of correcting lift by applying the brakes.

15. A method as recited in claim 8 further comprising the step of correcting lift by applying a steering correction.

16. A method as recited in claim 8 further comprising the step of calculating a traction level.

17. A system for detecting lift of a wheel of an automotive vehicle comprising:

a speed sensor coupled to the wheel producing a wheel speed signal;

a torque control system coupled to the wheel for changing the torque at the wheel;

a controller coupled to the said torque control system and the wheel speed sensor, said controller determining lift by changing the torque of the wheel, measuring a change in the wheel speed and indicating lift in response to a predetermined change in wheel speed.

18. A method for determining wheel lift of a vehicle comprising the steps of:

applying a torque to the wheel by applying a brake torque;

increasing the brake torque to build until a maximum brake torque threshold is achieved;

detecting the change in wheel speed since the application of brake torque;

comparing the change in wheel speed to a threshold;

when the change in speed is above the wheel speed change threshold value, indicating wheel lift;

when the brake torque reaches a maximum value before the change in wheel speed reaches the threshold, holding the torque for a predetermined amount of time;

continuing to monitor the change in wheel speed during a hold duration;

determining a second change in wheel speed;

comparing the second wheel speed to the threshold value;

when the second wheel speed exceeds the threshold value during the hold duration, indicating a wheel lift.

19. A method as recited in claim 18 further comprising the steps of:

releasing the torque;

determining a wheel speed change;

when the wheel speed change is greater than a reacceleration threshold, indicating wheel contact;

when the wheel speed change is less than the threshold, confirming an indication of wheel lift.

20. A method as recited in claim 18 further comprising the step of calculating a traction level.

21. A method as recited in claim 18 further comprising the step of when wheel lift is detected, continually monitoring the wheel speed change for a sudden increase to acknowledge wheel contact.

* * * * *